US007775197B2

(12) United States Patent
Hannewald et al.

(10) Patent No.: US 7,775,197 B2
(45) Date of Patent: Aug. 17, 2010

(54) ENGINE SUB-SYSTEM ACTUATORS HAVING VARIABLE RATIO DRIVE MECHANISMS

(75) Inventors: Thomas Hannewald, Griesheim (DE); Russell Miles Modien, Chatham (CA)

(73) Assignee: Continental Automotive Canada, Inc., Chatham, Ontario (CA)

( * ) Notice: Subject to any disclaimer, the term of this patent is extended or adjusted under 35 U.S.C. 154(b) by 322 days.

(21) Appl. No.: 11/774,791

(22) Filed: Jul. 9, 2007

(65) Prior Publication Data

US 2008/0105240 A1 May 8, 2008

Related U.S. Application Data

(60) Provisional application No. 60/806,811, filed on Jul. 10, 2006.

(51) Int. Cl.

| | |
|---|---|
| ***F02M 25/07*** | (2006.01) |
| ***F02B 47/08*** | (2006.01) |
| ***F16K 31/44*** | (2006.01) |
| ***F16K 1/22*** | (2006.01) |
| ***F16H 21/18*** | (2006.01) |

(52) U.S. Cl. ...................... 123/568.24; 74/43; 251/233; 251/305

(58) Field of Classification Search ................. 123/336, 123/337, 361, 376, 399–401, 568.11, 568.23, 123/568.24; 251/231–235, 248, 249, 249.5, 251/304–308, 315; 74/42, 43, 63–75

See application file for complete search history.

(56) References Cited

U.S. PATENT DOCUMENTS

| | | | | |
|---|---|---|---|---|
| 5,161,419 | A * | 11/1992 | Moy et al. | 74/42 |
| 5,461,863 | A * | 10/1995 | Simonds | 60/676 |
| 5,562,081 | A | 10/1996 | Hitchcock | |
| 6,698,300 | B2 * | 3/2004 | Swan | 74/89.18 |
| 6,820,590 | B2 | 11/2004 | Muraji | |
| 6,851,993 | B2 * | 2/2005 | Takada et al. | 440/88 A |
| 6,974,119 | B2 | 12/2005 | Brendle et al. | |
| 2006/0266142 | A1 * | 11/2006 | Hemphill | 74/335 |

FOREIGN PATENT DOCUMENTS

| | | | | |
|---|---|---|---|---|
| DE | 3329791 | A1 | 2/1985 | |
| DE | 10245193 | A1 | 4/2003 | |
| EP | 0791134 | B1 | 9/1996 | |
| JP | 2002267036 | A * | 9/2002 | 251/304 |
| JP | 2004315697 | A * | 11/2004 | 251/304 |

* cited by examiner

*Primary Examiner*—Willis R Wolfe, Jr.

(57) ABSTRACT

An EGR valve (20) comprises three gear parts (40, 42, 44) that provide a variable ratio drive system through which an electric actuator (34) operates a movable valve element (26). Each of the gear parts (40, 42, 44) is a single unitary part, with one part (42) containing two sets of gear teeth (46, 48) each associating with a set of gear teeth of a respective one of the other two parts. Limit stops (56, 58, 60; 68, 70) are integrally formed in two parts (42, 44).

15 Claims, 5 Drawing Sheets

ENGINE SUB-SYSTEM ACTUATORS HAVING VARIABLE RATIO DRIVE MECHANISMS

REFERENCE TO A RELATED APPLICATION AND PRIORITY CLAIM

This application claims the priority of Provisional Application No. 60/806,811, filed Jul. 10, 2006.

FIELD OF THE INVENTION

This invention relates to actuators of devices that perform certain functions in certain sub-systems of an internal combustion engine that propels a motor vehicle. Examples of such sub-systems are engine intake, engine exhaust, and exhaust gas recirculation (EGR). Examples of particular devices having actuators for performing control functions include engine manifold tuners, emission control valves such as EGR valves, air control valves, exhaust back-pressure control valves, and turbochargers.

BACKGROUND OF THE INVENTION

When the movable element of certain control devices is moved from a stationary position by an actuator, static friction must typically be overcome before the control element can begin to move. For controlling a control device having an electric actuator such as a linear or rotary electric motor that moves a control valve element, known control strategies can provide an electrical solution for adjustment of the control signal to the actuator to provide the increased force or torque needed to overcome static friction. However, once static friction has been overcome, the added force or torque typically becomes unnecessary, and indeed often undesirable.

When an actuator, or some portion of the load that is moved by an actuator, includes a biasing member such as a return spring, it may be desirable to include compensation for the variable force or torque exerted by such as biasing member as part of the overall control strategy.

It is also known to incorporate a variable ratio drive mechanism as a mechanical solution for compensating for opposing force or torque that changes in some way either linearly or non-linearly as a function of the position and/or velocity of a load that is being moved by an actuator, such as when a return spring is present. The function of a variable ratio drive mechanism is to provide an improved torque/force advantage over a particular region or regions of motion while providing reasonable response or speed of movement over the complete range of motion. Such a mechanical solution may be used by itself or in conjunction with an electrical solution.

A gear-type variable ratio drive mechanism is one type of such a mechanism. Incorporation of this type of mechanism into an actuator involves gear ratio selection. For the capability of a particular electric actuator to move a load, the gear ratio that is finally selected is inherently a compromise between adequate torque/force and speed of motion because increasing the ratio to deliver more force/torque to the load reduces the speed of movement of the load, and vice versa.

Furthermore, for any of various reasons other than static friction and biasing, reasons that may depend on the particular type of control device being operated, the effective loading on the actuator may be significantly different over different portions of the range of motion of the movable element. For example, sticking due to contamination or a change in differential fluid pressure acting on a moveable valve element, such as when the valve element is cracked open, can change the load imposed on the actuator in a way that calls for some sort of compensation, either electrically and/or mechanically.

When varying force or torque requirements have to be compensated in the presence of cost and/or environmental and/or packaging constraints, optimal solutions can be difficult to realize.

SUMMARY OF THE INVENTION

The present invention relates to improvements in variable ratio drive mechanisms of actuators that are used to operate control devices in engine sub-systems, such as have been referred to above.

The disclosed embodiments of variable ratio drive mechanisms are believed to provide solutions that are especially useful when significant constraints, such as available space and cost, and/or particular force/torque and performance demands, are required.

A feature of an embodiment that employs sets of gear teeth arranged to provide a variable drive ratio relates to the integration of two sets of gear teeth into a single unitary part of the mechanism. This eliminates any need to assemble the two sets of gear teeth and the possible tolerance implications of such an assembly process.

Limit stops for defining the operating range of the drive mechanism are also integrated into that single unitary part as well as into a second single unitary part containing a set of teeth that are driven by the teeth of one of the two sets in the first single unitary part.

Practical examples of improvements obtained in certain valves by using a variable drive ratio mechanism instead of a constant ratio mechanism are illustrated 1) by about a 40% torque improvement at the start of opening a closed valve without significantly affecting overall response time (full travel), 2) by increasing start force from about 200 newtons to about 300 newtons when translating rotary motion into linear motion, thereby exceeding a minimum requirement for avoiding valve sticking due to exhaust fouling in an EGR valve, and 3) by an ability to meet peak demand by using a smaller, and less expensive, electric motor without significantly compromising actuator response time.

One general aspect of the invention relates to a combustion engine comprising a sub-system having a movable element that is moved by an actuator to control flow of a fluid associated with operation of the engine. The actuator comprises a prime mover and a mechanism coupling the prime mover with the movable element.

The mechanism comprises 1) a first part that is turned about a first axis by the prime mover and that comprises a first set of gear teeth arranged at a constant radius about the first axis, 2) a second part comprising a second set of gear teeth arranged at a constant radius to a second axis about which the second part turns and in mesh with the set of gear teeth of the first part for causing the second part to turn about the second axis in response to turning of the first part about the first axis, the second part further comprising a third set of gear teeth comprising teeth extending in succession along an arc described by a radius that, as measured to the second axis, increases in one circumferential sense about the second axis, 3) a third part comprising a fourth set of gear teeth comprising teeth that extend in succession along an arc described by a radius that, as measured to a third axis about which the third part turns, decreases in a circumferential sense in correspondence with the increasing radius of the third set of teeth of the second part, and 4) an operative connection from the third part to the moveable element for converting turning of the third part into movement of the movable element.

The teeth of the third and fourth sets that extend along the respective arcs are arranged to have a mutual meshing association that, with the second part turning about the second axis at a constant speed, causes the third part to turn about the third axis at a speed, the ratio of which to the constant speed of the second part changes as successive teeth of each respective set come into mesh.

A further aspect relates to the actuator just described.

Another general aspect relates to an engine comprising a sub-system having a movable element that is moved by an actuator to control flow of a fluid associated with operation of the engine. The actuator comprises a prime mover and a mechanism coupling the prime mover with the movable element.

The mechanism comprises 1) a first link arranged to be swung about a first axis by the prime mover, 2) a second link arranged to swing about a second axis that is parallel to and spaced from the first axis, 3) a constraint that operatively couples the links to cause swinging of the first link about the first axis to swing the second link about the second axis with a mechanical advantage that changes as the first link swings the second link, and 4) an operative connection from the second link to the moveable element for converting swinging of the second link into movement of the movable element.

Still more aspects will be seen in the accompanying drawings and described in the detailed description given herein.

BRIEF DESCRIPTION OF THE DRAWINGS

The accompanying drawings, which are incorporated herein and constitute part of this specification, illustrate a presently preferred embodiment of the invention according to the best mode contemplated at this time, and, together with the detailed description given here, serve to disclose the various aspects and features of the invention.

DETAILED DESCRIPTION OF THE INVENTION

Figure 1:
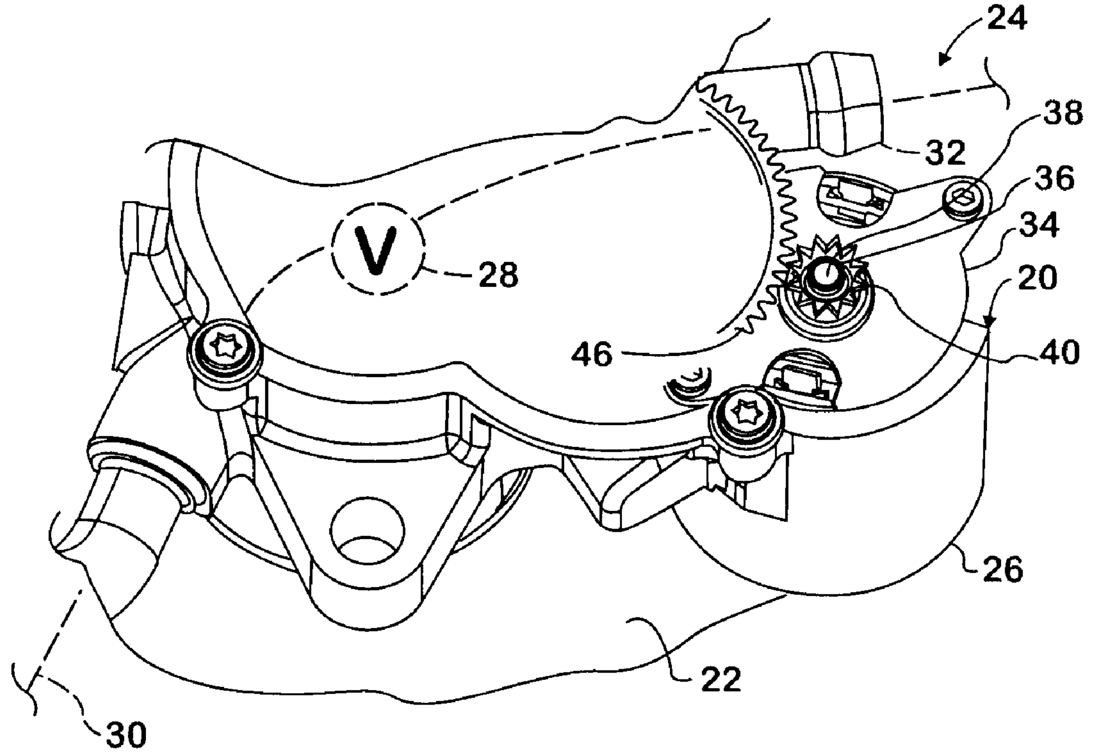
FIG. 1 is a fragmentary perspective view, partially schematic, of an engine comprising an EGR valve embodying principles of the present invention.
Figure 2:
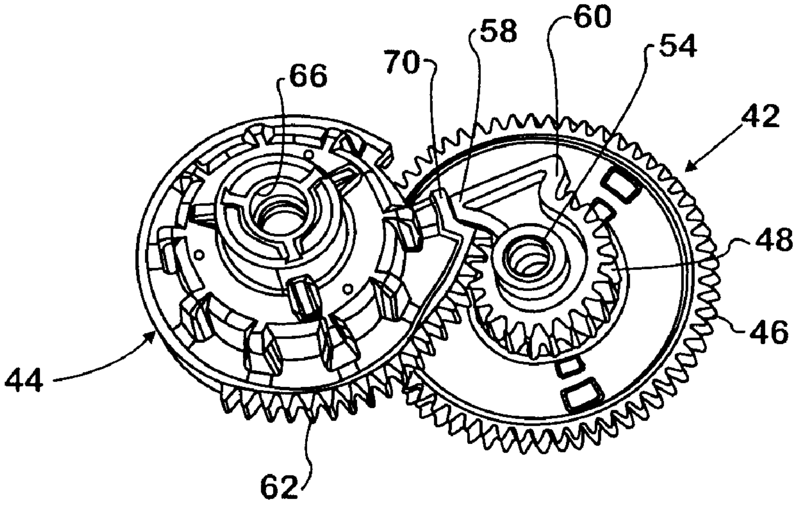
FIG. 2 is a perspective view of two parts that have been removed from FIG. 1 for illustrative clarity.
Figure 3:
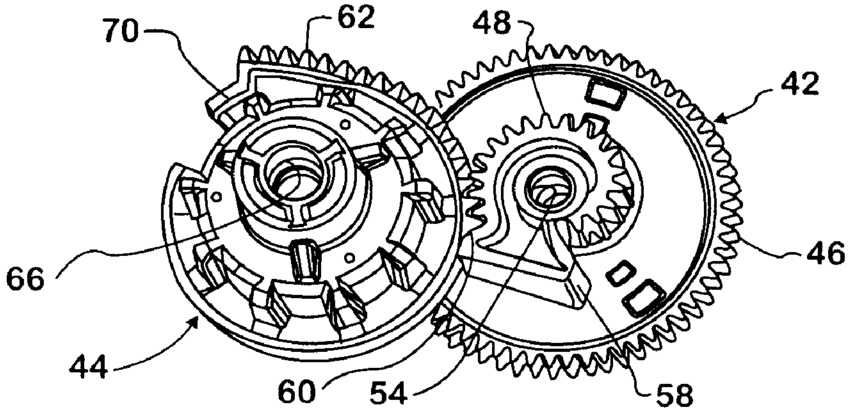
FIG. 3 is a perspective view of the two parts removed from FIG. 1, but showing a different position from that shown in FIG. 2 for purposes of explaining principles of the invention.

FIGS. 1, 2, and 3 collectively show an embodiment of the present invention comprising an engine EGR valve 20 mounted on an internal combustion engine 22 as part of an EGR sub-system 24 that provides controlled recirculation of engine exhaust gas to an intake system of the engine.

Valve 20 comprises a valve body 26 that contains a valve element 28 for controlling exhaust gas flow between ports 30, 32. Valve element 28 is shown schematically to represent any of various types of valve elements that are used for controlling EGR.

EGR valve 20 comprises a rotary electric actuator 34, i.e. a rotary motor, having an output shaft 36 that rotates about an axis 38 when the actuator is operated by electric current from a control source. Actuator 34 is bi-directional, meaning that it will rotate clockwise when energized for clockwise rotation and counter-clockwise when energized for counter-clockwise rotation.

A toothed gear 40, shown by example as a constant radius spur gear, is affixed to shaft 36 to turn either clockwise or counterclockwise depending on how actuator 34 is being energized.

Gear 40 forms a first part of an actuator drive mechanism that operates valve element 28 to control EGR flow through valve 20. A second part 42 and a third part 44 of the drive mechanism are shown in FIGS. 2 and 3.

Part 42 is a single unitary piece in which two sets 46, 48 of gear teeth, also shown as spurs, are integrally formed. In the actuator drive mechanism, the teeth of gear 40 may be considered a first set of teeth, and those of sets 46, 48, second and third sets of teeth respectively.

Figure 9:
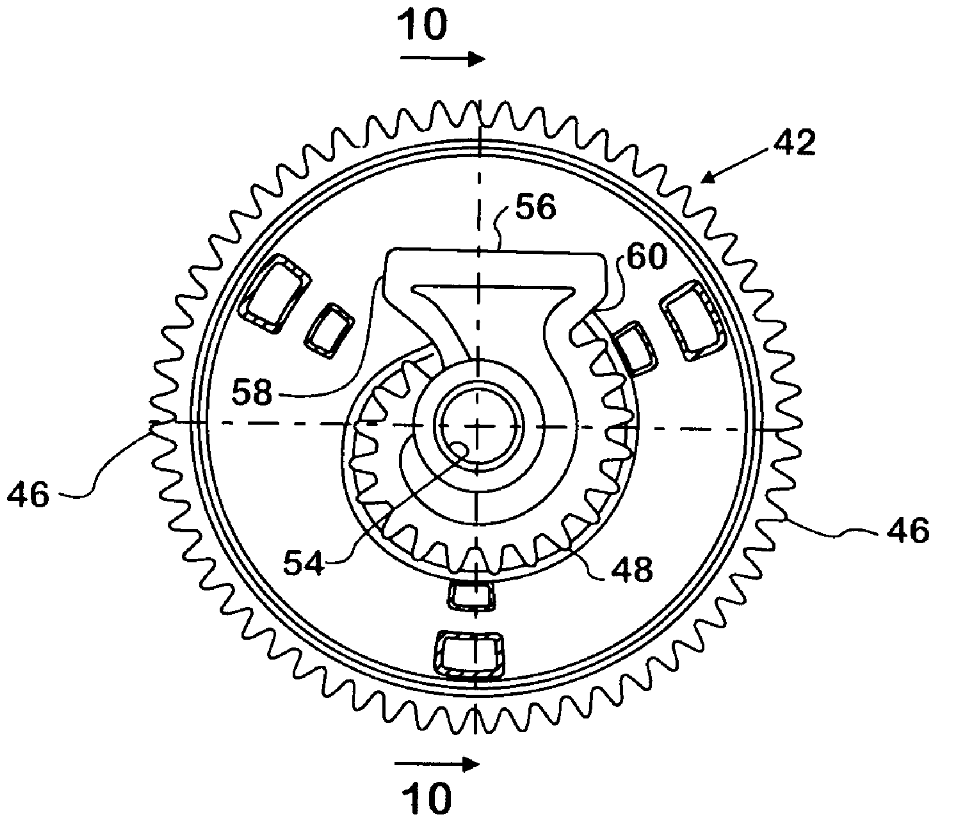
FIG. 9 is a top plan view of one of the parts shown in FIGS. 2 and 3.
Figure 10:
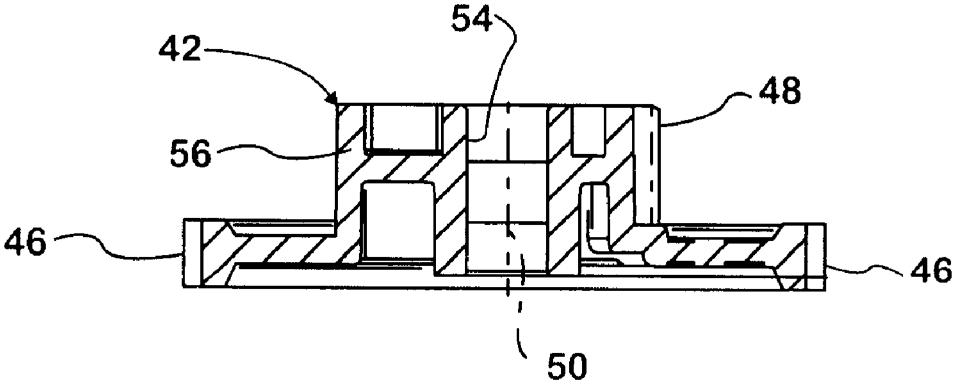
FIG. 10 is a cross section view taken along line 10-10 in FIG. 9.

Additional detail of part 42 is illustrated in FIGS. 9 and 10. The teeth of set 46 are arranged at a constant radius as measured to an axis 50. Some of the teeth of set 48, starting at about the 10:30 o'clock position as viewed in FIG. 9, are arranged to extend in succession along an arc described by a radius that, as measured to axis 50, increases in the counterclockwise sense about axis 50 as viewed in FIG. 9. Other teeth of set 48, beginning at about 7:30 o'clock where the arc of increasing radius ends, extend in succession in the counterclockwise sense about axis 50 along a constant radius arc as measured to axis 50 that has essentially the same radius as that at the 7:30 o'clock end of the arc of increasing radius. The constant radius teeth continue to about the 1:30 o'clock position.

FIG. 10 shows the portion of part 42 that contains the teeth of set 48 to be a tower-like formation supported on a central portion of a base-like formation that contains the teeth of set 46. Part 42 further comprises a central through-hole 54 coaxial with axis 50 that provides for part 42 to be journaled for turning on a mounting in valve body 26 about axis 50.

Part 42 further comprises a wall 56 that extends from about the 11:00 o'clock position to slightly beyond the 1:00 position to bridge opposite ends of set 48. Wall 56 comprises end faces 58, 60 confronting respective teeth at opposite ends of the set.

As shown by FIGS. 2, 3, 11, and 12, part 44 is a single unitary piece in which a set 62 of gear teeth, also shown as spurs, is integrally formed. In the actuator drive mechanism, the teeth of set 62 may be considered a fourth set of teeth.

Figure 11:
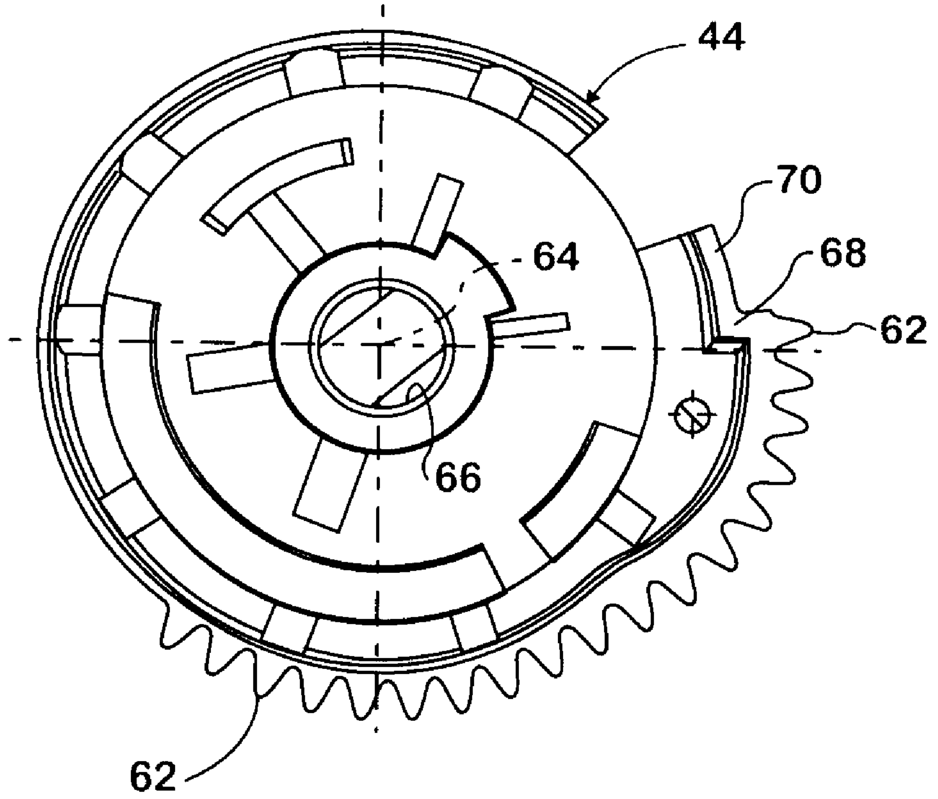
FIG. 11 is a top plan view of the other one of the parts shown in FIGS. 2 and 3.

Some of the teeth of set 62, starting slightly beyond the 7:00 o'clock position as viewed in FIG. 11, are arranged to extend in succession along an arc described by a radius that, as measured to an axis 64 is constant in the counterclockwise sense about axis 64 to about the 5:00 o'clock position. From that point the remaining teeth continue in succession counterclockwise about axis 64 along an arc that is described by an increasing radius arc as measured to axis 64. In the clockwise sense that arc is described by a decreasing radius.

Figure 12:
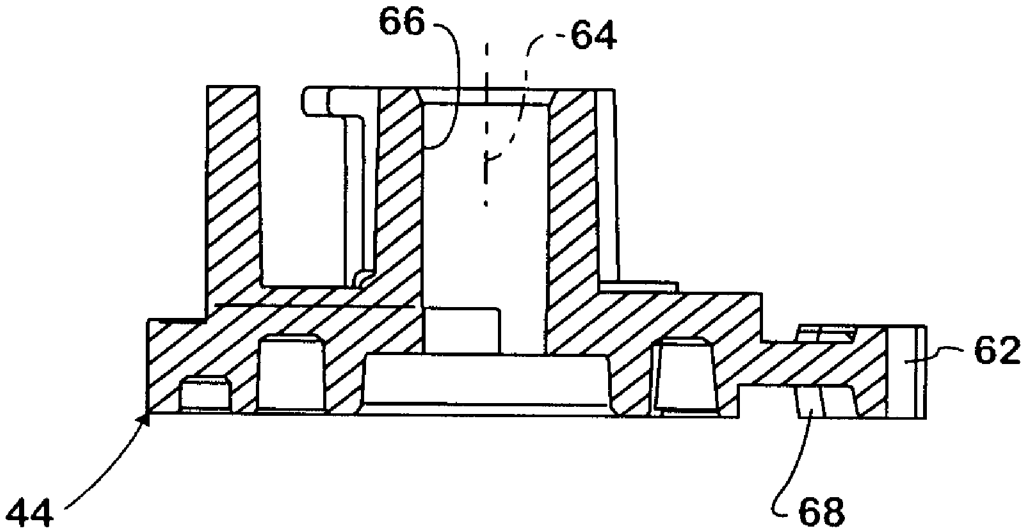
FIG. 12 is a cross section view taken along line 12-12 in FIG. 11.

FIG. 12 shows the portion of part 44 that contains the teeth of set 62 to be a base-like formation on which a tower-like formation is supported. Part 44 further comprises a central through-hole 66 extending through both formations co-linear with axis 64 to provide for engagement with a shaft that forms a part or all of a coupling to valve element 26. If valve element 26 is mounted for turning as in a rotary type valve, the shaft may provide a direct coupling to the valve element. If valve element 26 is mounted for linear translation as in a pintle type valve, the shaft rotation can be converted by an appropriate mechanism into translatory motion.

FIG. 1 shows gear 40 in mesh with teeth of set 46. FIGS. 2 and 3 show teeth of set 48 in mesh with teeth of set 62. FIG. 2 shows the relative positions of parts 42, 44 when valve element 26 is closed. FIG. 3 shows the relative positions of parts 42, 44 when valve element 26 is maximally open.

Figure 4:
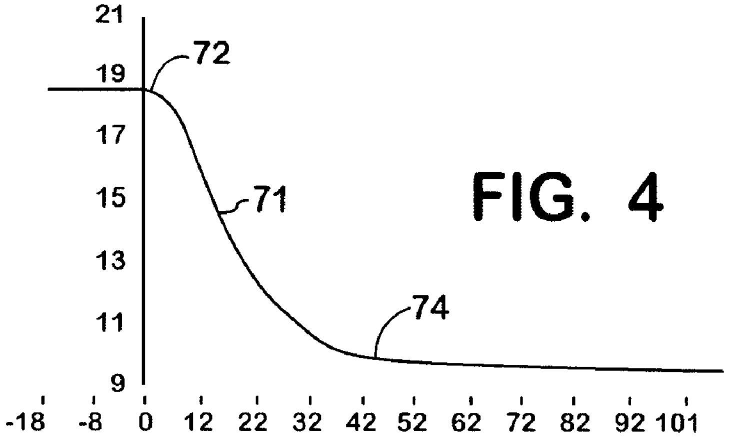
FIG. 4 is a graph plot disclosing a relationship for the parts shown in FIGS. 2 and 3 that is useful in understanding principles of the invention.

The mechanism provides a variable gear ratio between the teeth of part 40 and those of set 62 that is defined by a trace 71 shown in FIG. 4 where gear ratio is measured along the vertical axis and relative position of parts 42, 44 along the horizontal. The point 72 on trace 71 corresponds to the relative positions of parts 42, 44 shown in FIG. 2 when valve element 26 is closed.

For a given torque delivered by motor 34 at maximum gear ratio, maximum torque is exerted by part 44 to operate valve element 26 from closed to open, an operation that requires static friction to be overcome. Once the valve element begins to open, the gear ratio progressively decreases with increasing valve element opening as the teeth of set 48 that lie on the arc described by an increasing radius in the counterclockwise direction relative to axis 50 successively engage the teeth of set 62 that lie on the arc described by a decreasing radius in the clockwise direction relative to axis 64. This is reflected by the decreasing portion of trace 71. When the constant radius portions of sets 48 and 62 come into mesh with each other at the point 74 on trace 71, continued turning of part 42 in the clockwise direction provides a constant gear ratio.

Stated another way, turning part 42 about axis 50 at a constant speed causes part 44 to turn about axis 64 at an increasing speed during the initial range of opening of valve element 26 and thereafter at a constant speed until the valve element is maximally open.

Faces 58 and 60 of wall 56 and features of part 44 mutually cooperate to define positive limit stops for clockwise and counterclockwise motion of both parts 42, 44. This arrangement allows the mechanism to avoid the use of external limit stops.

Part 44 comprises a wall 68 immediately circumferentially beyond the last tooth at one end of set 62. The wall has a face 70 that faces radially outward relative to axis 64. In the position shown in FIG. 2, it can be seen that faces 58 and 70 are in abutment that prevents further counterclockwise turning of part 42 and further clockwise turning of part 44.

End face 60 is shaped to abut the flank of the last tooth at the opposite end of set 62 when the parts 42, 44 are in the position shown in FIG. 3. This prevents further clockwise turning of part 42 and further counterclockwise turning of part 44.

It is to be understood actual EGR control will continually operate the valve element to appropriate positions within the range spanning closed position and maximally open position based on some control strategy. Fastest response occurs over the portion of the range to the right of point 74 in FIG. 4. Increasing torque is delivered over the portion of the range extending leftward from point 74.

Figure 5:
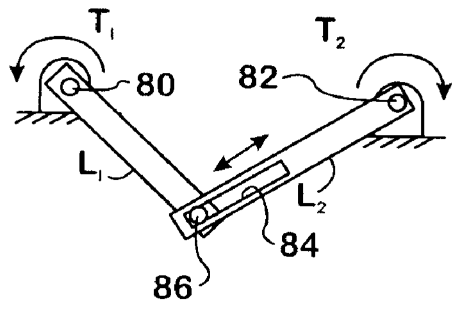
FIG. 5 is a schematic diagram of a portion of another embodiment of the invention.

A further embodiment of the invention is shown in FIG. 5. A first link $L_1$ can swing about an axis 80. A second link $L_2$ is arranged to swing about an axis 82. The two links are constrained by a constant width slot 84 in the second link that has a length that is radial to axis 82 and a pin, or roller, 86 affixed to the first link at some radial distance from axis 80 and arranged to fit in slot 84. FIG. 5 shows pin 86 proximate the radially outer end of slot 84.

When a torque $T_1$ is applied to link $L_1$ in a counterclockwise sense about axis 80, the counterclockwise turning of link $L_1$ causes pin 86 to apply a force against one side of slot 84. That force can be resolved into a component that is parallel to the slot length and a component that is perpendicular to the slot length. The latter component applies a clockwise torque to link $L_2$ reflected as a clockwise torque $T_2$ about axis 82. Because pin 86 is unconstrained lengthwise of slot 84, the former travels radially inward within the latter as link $L_1$ continues to swing counterclockwise, swinging link $L_2$ clockwise in the process.

Figure 6:
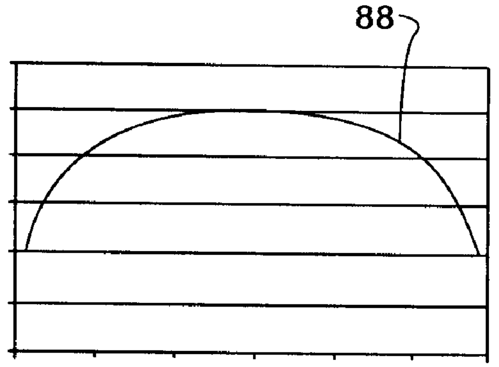
FIG. 6 is a graph plot disclosing a relationship for the parts of the embodiment shown in FIG. 5 that is useful in understanding principles of the invention.

As the links swing, the constraint between them causes the mechanical advantage between the first link and the second link to change. FIG. 6 shows, on a non-dimensional scale, a trace 88 that is representative of how the mechanical advantage changes as a function of the angle of turning of link $L_1$ about axis 80.

By coupling an actuator (not shown in FIG. 5) in any suitably appropriate way to swing link $L_1$, and coupling a movable element like valve element 26 to link $L_2$ in any suitably appropriate way, the movable element can be operated with a torque $T_2$ that for a constant torque $T_1$ varies as a function of the angle of turning of link $L_1$ about axis 80.

Turning of link $L_1$ can be accomplished by connecting the link to the shaft of a bi-directional rotary electric motor at axis 80. Alternately an extensible member of an actuator can be connected to the link at a distance from axis 80 to exert circumferential force for turning the link.

Figure 7:
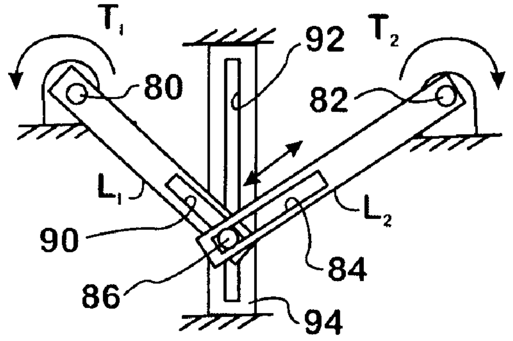
FIG. 7 is a schematic diagram of a portion of still another embodiment of the invention.

A still further embodiment of the invention is shown in FIG. 7. It too employs a first link $L_1$ and a second link $L_2$. However, pin, or roller, 86 is not affixed to the first link. Rather link $L_1$ now has a constant width slot 90 that has a length that is radial to axis 80. Pin 86 passes through both slots 84 and 90 at some radial distance from axes 80 and 82. FIG. 7 shows pin 86 proximate the radially outer ends of both slots 84, 90.

The constraint between the two links that makes them effective in having a variable mechanical advantage as they swing comprises a member that provides a track that constrains pin 86 to a path of motion that is transverse, such as perpendicular, to an imaginary line passing through axes 80 and 82. As shown in the example, the track is a constant width slot 92 in a stationary member 94.

Figure 8:
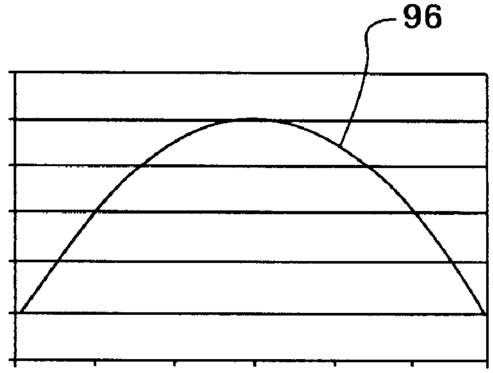
FIG. 8 is a graph plot disclosing a relationship for the parts of the embodiment shown in FIG. 7 that is useful in understanding principles of the invention.

This arrangement serves in effect to move pin 86 radially along link $L_1$ as that link turns. When a torque $T_1$ is applied to link $L_1$ in a counterclockwise sense about axis 80, the counterclockwise turning of link $L_1$ acts through pin 86 to apply a force against one side of slot 84, turning link $L_2$ in the same way as in FIG. 5. As the links swing, the constraint causes the mechanical advantage between them to change, but with a different relationship than the embodiment of FIG. 5, as shown by a trace 96 on a non-dimensional scale in FIG. 8. The actuator and movable element can be coupled to the variable ratio mechanism of FIG. 7 as described in connection with FIG. 5.

While the foregoing has described a preferred embodiment of the present invention, it is to be appreciated that the inventive principles may be practiced in any form that falls within the scope of the following claims.

What is claimed is:

1. An engine comprising:

a sub-system having a movable element that is moved by an actuator to control flow of a fluid associated with operation of the engine;

the actuator comprising a prime mover and a mechanism coupling the prime mover with the movable element;

the mechanism comprising 1) a first link arranged to be swung about a first axis by the prime mover, 2) a second link arranged to swing about a second axis that is parallel to and spaced from the first axis, 3) a constraint that operatively couples the links to cause swinging of the first link about the first axis to swing the second link about the second axis with a mechanical advantage that changes as the first link swings the second link, and 4) an operative connection from the second link to the moveable element for converting swinging of the second link into movement of the movable element, wherein the constraint that operatively couples the links comprises a slot within one of the first and second links and a guide member connected to the other of the first and second links that guides within the slot.

2. An Exhaust Gas Recirculating (EGR) valve assembly comprising:

a valve movable by an actuator to control flow of a fluid through the EGR valve assembly;

a first gear rotatable about a first axis by the actuator, the first gear including a first set of gear teeth arranged at a constant radius to the first axis;

a second gear including a second set of gear teeth arranged at a constant radius to a second axis about which the second gear turns, the second set of gear teeth in mesh with the first set of gear teeth of the first gear for causing the second part to turn about the second axis, the second gear including a third set of gear teeth comprising teeth extending in succession along an arc described by a radius that increases in one circumferential sense about the second axis;

a third gear rotatable about a third axis and including a fourth set of gear teeth that extend in succession along an arc described by a radius relative to a third axis that decreases in a circumferential sense in correspondence with the increasing radius of the third set of gear teeth of the second gear; and an operative connection between the third gear and the valve for moving the valve, wherein meshing engagement between the third set of gear teeth and the fourth set of gear teeth extends along the respective arcs such that turning of the second gear about the second axis at a constant speed, causes the third gear to turn about the third axis at a speed, the ratio of which to the constant speed of the second part changes as successive teeth of the third and fourth sets come into mesh.

3. The EGR valve assembly as set forth in claim 2, wherein the third and fourth sets of teeth comprise respective additional teeth that extend along respective arcs described by respective constant radii relative to the respective second and third axes and that mesh when the teeth that extend along respective arcs that are described by respective radii that increase and decrease come out of mesh, thereby causing the second and third gears to cease turning at a variable speed ratio and begin turning at a constant speed ratio.

4. The EGR valve assembly as recited in claim 2 wherein the second and third gears include cooperating limit stops that come into mutual abutment to limit clockwise and counterclockwise turning of both the second and third gears.

5. A valve comprising:

a movable valve element that is moved by an actuator to control flow of a fluid through the valve assembly;

the actuator comprising a prime mover and a mechanism coupling the prime mover with the valve element ;

the mechanism comprising 1) a first part that is turned about a first axis by the prime mover and that comprises a first set of gear teeth arranged at a constant radius to turn about the first axis, 2) a second part comprising a second set of gear teeth arranged at a constant radius to a second axis about which the second part turns and in mesh with the set of gear teeth of the first part for causing the second part to turn about the second axis in response to turning of the first part about the first axis, the second part further comprising a third set of gear teeth comprising teeth extending in succession along an arc described by a radius that, as measured to the second axis, increases in one circumferential sense about the second axis, 3) a third part comprising a fourth set of gear teeth comprising teeth that extend in succession along an arc described by a radius that, as measured to a third axis about which the third part turns, decreases in a circumferential sense in correspondence with the increasing radius of the third set of teeth of the second part, and 4) an operative connection from the third part to the valve element for converting turning of the third part into movement of the valve element, wherein the teeth of the third and fourth sets that extend along the respective arcs are arranged to have a mutual meshing association that, with the second part turning about the second axis at a constant speed, causes the third part to turn about the third axis at a speed, the ratio of which to the constant speed of the second part changes as successive teeth of each respective set come into mesh.

6. A valve as set forth in claim 5 wherein the third and fourth sets of teeth comprise respective additional teeth that extend along respective arcs described by respective constant radii relative to the respective second and third axes and that begin to mesh when the teeth that extend along respective arcs that are described by respective radii that increase and decrease come out of mesh, thereby causing the second and third parts to cease turning at a variable speed ratio turn and instead turn at a constant speed ratio.

7. A valve as set forth in claim 5 wherein the second and third parts comprise cooperating limit stops that come into mutual abutment to limit clockwise and counterclockwise turning of both the second and third parts.

8. A valve as set forth in claim 7 wherein the third part comprises a wall having a radially outward facing face at one end of the fourth set of teeth, the second part comprises a wall having a face that is disposed radially outward of the third set of teeth at one end of the third set of teeth, and the respective wall faces are arranged to define one of the limit stops by mutual abutment.

9. A valve as set forth in claim 8 wherein the wall of the second part comprises a further face that is disposed radially outward of the third set of teeth at the other end of the third set of teeth and is arranged to define the other limit stop by mutual abutment with the flank of the last tooth at the other end of the fourth set of teeth.

10. A combustion engine comprising:

a sub-system having a movable element that is moved by an actuator to control flow of a fluid associated with operation of the engine;

the actuator comprising a prime mover and a mechanism coupling the prime mover with the movable element;

the mechanism comprising 1) a first part that is turned about a first axis by the prime mover and that comprises a first set of gear teeth arranged at a constant radius to turn about the first axis, 2) a second part comprising a second set of gear teeth arranged at a constant radius to a second axis about which the second part turns and in mesh with the set of gear teeth of the first part for causing the second part to turn about the second axis in response to turning of the first part about the first axis, the second part further comprising a third set of gear teeth comprising teeth extending in succession along an arc described by a radius that, as measured to the second axis, increases in one circumferential sense about the second axis, 3) a third part comprising a fourth set of gear teeth comprising teeth that extend in succession along an arc described by a radius that, as measured to a third axis about which the third part turns, decreases in a circumferential sense in correspondence with the increasing radius of the third set of teeth of the second part, and 4) an operative connection from the third part to the moveable element for converting turning of the third part into movement of the movable element, wherein the teeth of the third and fourth sets that extend along the respective arcs are arranged to have a mutual meshing association that, with the second part turning about the second axis at a constant speed, causes the third part to turn about the third axis at a speed, the ratio of which to the constant speed of the second part changes as successive teeth of each respective set come into mesh.

11. A combustion engine as set forth in claim 1 wherein the sub-system is an EGR sub-system and the movable element is the valve element of an EGR valve.

12. A combustion engine as set forth in claim 10 wherein the third and fourth sets of teeth comprise respective additional teeth that extend along respective arcs described by respective constant radii relative to the respective second and third axes and that begin to mesh when the teeth that extend along respective arcs that are described by respective radii that increase and decrease come out of mesh, thereby causing the second and third parts to cease turning at a variable speed ratio turn and instead turn at a constant speed ratio.

13. A combustion engine as set forth in claim 12 wherein the second and third parts comprise cooperating limit stops that come into mutual abutment to limit clockwise and counterclockwise turning of both the second and third parts.

14. A combustion engine as set forth in claim 13 wherein the third part comprises a wall having a radially outward facing face at one end of the fourth set of teeth, the second part comprises a wall having a face that is disposed radially outward of the third set of teeth at one end of the third set of teeth, and the respective wall faces are arranged to define one of the limit stops by mutual abutment.

15. A combustion engine as set forth in claim 14 wherein the wall of the second part comprises a further face that is disposed radially outward of the third set of teeth at the other end of the third set of teeth and is arranged to define the other limit stop by mutual abutment with the flank of the last tooth at the other end of the fourth set of teeth.

* * * * *